J. M. JOHNSON.
WHEEL.
APPLICATION FILED JAN. 9, 1908.
1,036,633.
Patented Aug. 27, 1912.
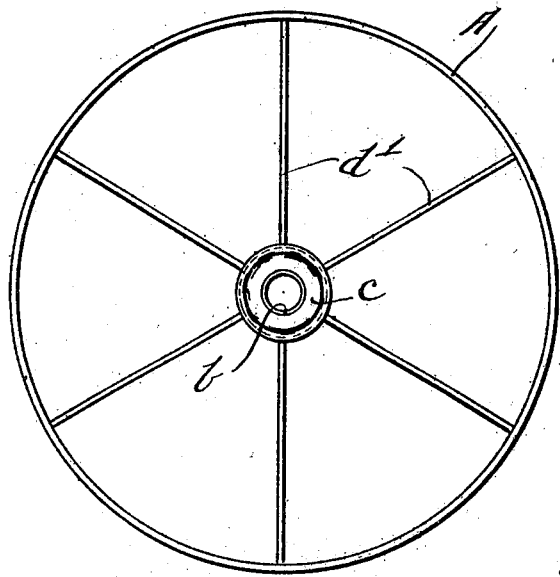
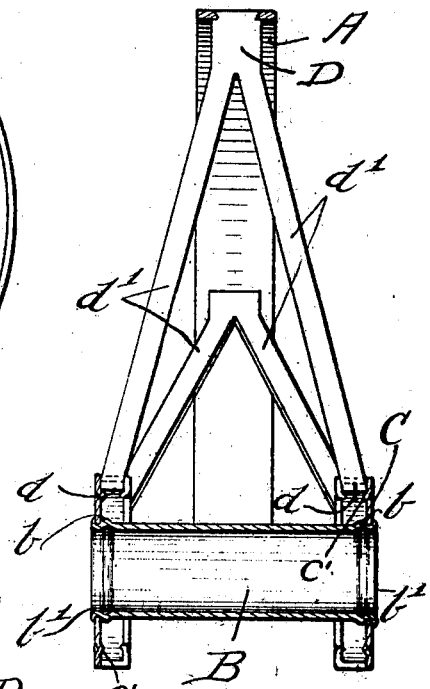
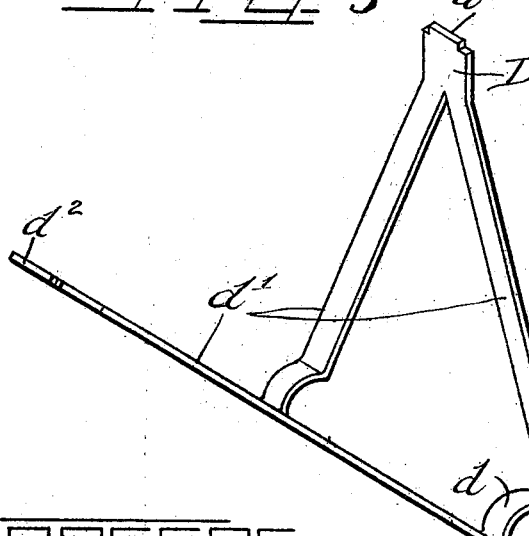
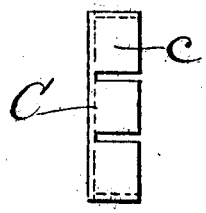
Witnesses
J. H. Angell
Inventor
Jay M. Johnson
by Charles E. Fields Atty

UNITED STATES PATENT OFFICE.

JAY M. JOHNSON, OF CHICAGO, ILLINOIS.

WHEEL.

1,036,633.

Specification of Letters Patent.   Patented Aug. 27, 1912.

Application filed January 9, 1908.   Serial No. 410,037.

*To all whom it may concern:*

Be it known that I, JAY M. JOHNSON, a citizen of the United States, and a resident of Chicago, Cook county, Illinois, have invented a new and useful Improvement in Wheels; and I do hereby declare that the following is a full, clear, and exact description of the same, reference being had to the accompanying drawings, and to the letters of reference marked thereon, which form a part of this specification.

This invention relates to that class of metallic wheels adapted to be constructed wholly of sheet metal or metallic plates.

The object of the invention is to afford an exceedingly strong and durable construction adapted for wheels of any size or for any service and in which comparatively narrow strips of metal are sheared longitudinally and centrally to afford for each strip a plurality of radial spokes integrally connected and diverging in pairs from the rim to the ends of the hub.

It is finally an object of the invention to afford an exceedingly cheap construction and adapted to enable scraps from sheet metal to be utilized in wheel construction, if desired.

The invention consists in the matters hereinafter described and more fully pointed out and defined in the appended claims.

In the drawings: Figure 1 is a side elevation of a wheel embodying my invention. Fig. 2 is an enlarged, fragmentary, transverse section of the same. Fig. 3 is an enlarged, perspective view showing the slit strip after the same has been bent and formed for insertion into the wheel. Fig. 4 is a side elevation of the washer or clip whereby the spokes are rigidly secured to the hub sleeve.

As shown in the drawings: A indicates the rim which in the present instance, as shown, is a flat rim though, of course, it may be of any suitable type or construction to enable a pneumatic tire to be attached thereto if desired. The rim is constructed of a single strip of metal of suitable length, the ends of which are welded or otherwise secured together to afford a one piece rim, and as shown, said rim is perforated transversely at intervals in its length to afford apertures corresponding in number with the number of sets of spokes to be used. The hub of the wheel B consists, as shown, of a tubular sleeve which also may be struck or rolled from sheet metal and as shown, is provided with a bead $b$, near each end thereof to afford a stop for the collars or washers C, whereby the spokes are secured to the hub, said bead acting to prevent said collars or washers from being pressed inwardly or in other words, acting to hold said collars at the ends of the sleeve. The spokes consist of a strip of sheet metal D, of approximately twice the radial distance from the sleeve to the rim. This strip is split longitudinally to near the ends thereof and is bent centrally affording at the bend an inwardly concaved portion $d$, and the webs on each side of the slit are sprung oppositely to afford two sets of divergent spokes $d'$, which are connected at their rim extremities by the terminal unslitted portion of the webs, the inner ends of the corresponding spokes of each set being connected by said concave bend $d$, as shown in Figs. 2 and 3.

The reduced ends $d^2$ of said strip are then inserted through appropriate apertures in the rim A and may be riveted down as shown in Fig. 2, or may be electrically or otherwise welded to the rim or braced thereto, if preferred, or connected therewith in any suitable manner to afford a permanent connection. The sleeve B is then inserted centrally and the apertured washer or collar C is slipped over each end thereof and the peripheral flange $c$ of said washer or collar which is slitted to receive the spokes therein is then slipped onto each end of the sleeve with the spokes $d'$ lying in said slit and the bend $d$ coinciding with the curvature of said flange between the slits and engaged above or resting on the bead $c'$ formed in the collar. A suitable press die, tool or any appliance is applied to the hub sleeve and washers or collars either simultaneously or singly to upset the slightly protruding end $b'$ of the hub sleeve to turn the same over the washer, to bend the collar beneath the bent portion of the spokes, if the bead has not been previously formed and also to bend the inner edge of the peripheral flange of the washer downwardly and inwardly, as shown in Fig. 2, to engage the loop or bend $d$ of the spokes firmly in place, in appropriate relation with the hub sleeve. In closing the flange $c$ inwardly any desired pressure or tension may be applied on the spokes and inasmuch as the tool employed may engage all parts of said flange at the same moment bending the same simultaneously inward, the pressure applied will obviously exert equal tension on said spokes, thereby very rigidly securing the hub sleeve and spokes together.

The operation is obvious from the construction described.

Of course, sheet or plate metal of any desired gage may be employed for the spokes, for the rim and for the hub sleeve and collars. In any event sheet or plate metal of sufficient gage is employed for the collars or washers to insure the requisite strength. Such being the case, it is obvious that wheels of any desired size and for any purpose may be constructed as described and practically any required strength may be thus assured. Of course, too, inasmuch as the divergent spokes of each pair are connected with the rim at the same point an exceedingly strong and bracing construction is afforded insuring great strength in proportion to the weight of the wheel. While I have shown but six sets of spokes, of course by the construction described any even number of sets of spokes greater or less than this may conveniently be employed.

Of course, I am aware that various modifications may be made in the construction described. However, I have shown but one of several embodiments of my invention and I therefore do not purpose limiting this application for patent otherwise than necessitated by the prior art.

I claim as my invention:

1. In a device of the class described a rim, a hub and flat metallic spokes arranged with the width of the metal directed longitudinally with the axis of the rim to resist lateral strain and a collar on each end of the hub provided with a bead and a flange, both of which engage the hub ends of the spokes to afford a rigid connection between the spokes and hub.

2. In a wheel of the class described a transversely slotted rim, a hub sleeve, a collar secured on each end of the sleeve, an inwardly directed slotted peripheral flange integral with the collar, and a spoke member comprising two pairs of diverging spokes having the spokes of each pair integral at the hub end with the corresponding spokes of the other pair and having said hub ends rigidly secured in the slots in the peripheral flange in the collar and the outer ends of said pairs of spokes secured in the transverse slots in the rim.

3. In a metallic wheel a hub sleeve, a collar secured on each end thereof, an inwardly directed slotted peripheral flange integral with the collar, and a spoke member comprising pairs of spokes integral at their apexes and diverging therefrom and having bent portions secured within the slots in the peripheral flange of the collar and integrally connecting the corresponding spokes of each pair.

4. In a device of the class described a rim, a hub, a plurality of spoke members each comprising two pairs of flat metallic spokes integral at their apexes and diverging therefrom and having bent portions integrally connected to the corresponding spokes of each pair and a collar on each end of the hub provided with a bead and a flange, both of which engage the hub ends of the spokes.

5. In a device of the class described a rim, a hub, a plurality of spoke members connecting said rim and hub each comprising two pairs of flat metallic spokes integral at their apexes and diverging therefrom and having independent bent portions integrally connected to the corresponding spokes of each pair.

6. A spoke member comprising two pairs of flat metallic spokes integral at their apexes and diverging therefrom and having independent bent portions integrally connected to the corresponding spokes of each pair.

In testimony whereof I have hereunto subscribed my name in the presence of two subscribing witnesses.

JAY M. JOHNSON.

Witnesses:
K. E. HANNAH,
J. W. ANGELL.